(12) United States Patent
Thebault et al.

(10) Patent No.: US 8,261,891 B2
(45) Date of Patent: Sep. 11, 2012

(54) METHOD OF SILICIDING THERMOSTRUCTURAL COMPOSITE MATERIALS, AND PARTS OBTAINED BY THE METHOD

(75) Inventors: Jacques Thebault, Bordeaux (FR); Rene Pailler, Cestas (FR); Jean-Christophe Ichard, Merignac (FR)

(73) Assignee: Snecma Propulsion Solide, Le Haillan (FR)

( * ) Notice: Subject to any disclaimer, the term of this patent is extended or adjusted under 35 U.S.C. 154(b) by 868 days.

(21) Appl. No.: 12/355,244

(22) Filed: Jan. 16, 2009

(65) Prior Publication Data

US 2009/0120743 A1 May 14, 2009

Related U.S. Application Data

(62) Division of application No. 10/545,734, filed as application No. PCT/FR2004/000345 on Feb. 16, 2004, now Pat. No. 7,497,918.

(30) Foreign Application Priority Data

Feb. 17, 2003 (FR) ...................................... 03 01871

(51) Int. Cl.
 *F16D 69/02* (2006.01)
(52) U.S. Cl. ............... 188/251 A; 188/251 R; 188/71.5; 428/317.5
(58) Field of Classification Search .............. 188/251 A, 188/251 R, 218 XL, 71.5; 427/201, 202, 427/204, 397.7, 419.7; 428/331, 408, 564, 428/698; 156/148, 149
 See application file for complete search history.

(56) References Cited

U.S. PATENT DOCUMENTS

| | | | |
|---|---|---|---|
| 4,120,731 A | 10/1978 | Hillig et al. | |
| 5,803,210 A * | 9/1998 | Kohno et al. | 188/73.1 |
| 5,853,821 A * | 12/1998 | Balhadere et al. | 427/601 |
| 5,869,411 A * | 2/1999 | Bazshushtari et al. | 442/340 |
| 5,962,135 A * | 10/1999 | Walker et al. | 428/408 |
| 6,083,619 A | 7/2000 | Frank et al. | |
| 6,221,475 B1 * | 4/2001 | Domergue et al. | 428/292.1 |
| 6,257,376 B1 * | 7/2001 | Borgeaud et al. | 188/71.5 |
| 6,668,984 B2 * | 12/2003 | Gray | 188/251 R |
| 6,740,408 B2 * | 5/2004 | Thebault et al. | 428/408 |
| 6,767,602 B1 * | 7/2004 | Duval et al. | 428/36.1 |
| 7,374,709 B2 * | 5/2008 | Bauer | 264/257 |
| 7,384,663 B2 * | 6/2008 | Olry et al. | 427/122 |
| 7,497,918 B2 * | 3/2009 | Thebault et al. | 156/89.26 |
| 2001/0033038 A1 | 10/2001 | Sakaguchi et al. | |
| 2002/0061396 A1 | 5/2002 | White | |

(Continued)

FOREIGN PATENT DOCUMENTS

DE 19545346 A1 7/1997

(Continued)

*Primary Examiner* — Robert A Siconolfi
*Assistant Examiner* — Mariano Sy
(74) *Attorney, Agent, or Firm* — Weingarten, Schurgin, Gagnebin & Lebovici LLP

(57) ABSTRACT

Within the pores of a porous thermostructural composite material, there is form an aerogel or xerogel made up of a precursor for a refractory material, the precursor is transformed by pyrolysis to obtain an aerogel or xerogel of refractory material, and then it is silicided by being impregnated with a molten silicon type phase. The aerogel or xerogel is formed by impregnating the composite material with a composition containing at least one organic, organometalloid, or organometallic compound in solution, followed by in situ gelling. The method is applicable to improving the tribological properties or the thermal conductivity of C/C or C/SiC composite material parts, or to making such parts leakproof.

10 Claims, 8 Drawing Sheets

U.S. PATENT DOCUMENTS

| | | |
|---|---|---|
| 2004/0012110 A1 | 1/2004 | Grader et al. |
| 2004/0038029 A1 | 2/2004 | Zinn et al. |
| 2004/0141908 A1 | 7/2004 | Hara et al. |
| 2005/0066574 A1 | 3/2005 | Cooper et al. |
| 2005/0244581 A1 | 11/2005 | Thebault et al. |
| 2007/0142222 A1 | 6/2007 | Erkey et al. |

FOREIGN PATENT DOCUMENTS

| | | |
|---|---|---|
| EP | 0 835 853 A1 | 4/1998 |

* cited by examiner

METHOD OF SILICIDING THERMOSTRUCTURAL COMPOSITE MATERIALS, AND PARTS OBTAINED BY THE METHOD

CROSS REFERENCE TO RELATED PUBLICATIONS

This application is a divisional of U.S. patent application Ser. No. 10/545,734 filed Aug. 16, 2005 which is a §371 national phase filing of PCT/FR2004/000345 filed Feb. 16, 2004, and claims priority to a French application No. 0301871 filed Feb. 17, 2003.

BACKGROUND OF THE INVENTION

The invention relates to siliciding thermostructural composite materials.

Thermostructural composite materials are known for their good mechanical properties and their ability to conserve those properties at high temperature. Such materials are typically carbon/carbon (C/C) composites having carbon fiber reinforcement and a carbon matrix, and ceramic matrix composites (CMCs) with fiber reinforcement made of refractory fibers (in particular carbon fibers or ceramic fibers) and a ceramic matrix, or a matrix both of carbon and of ceramic (e.g. a matrix of silicon carbide SiC or a combined C/SiC matrix).

Parts made of C/C or CMC material are made by preparing a fiber structure or "preform" of a shape close to that of the part to be made, and densifying the preform with the carbon or ceramic matrix. Densification can be performed by a liquid technique or by a gas technique. The liquid technique consists in impregnating the preform with a liquid composition containing a precursor for the matrix, typically a resin. The precursor is transformed by heat treatment, thereby pyrolyzing the resin. The gas technique consists in performing chemical vapor infiltration (CVI). The preform is placed in an oven into which a reaction gas is introduced. The pressure and temperature conditions in the oven are adjusted so as to enable the gas to diffuse within the fiber preform and form a deposit of matrix material on the fibers, either by one of the components of the gas decomposing, or else by a reaction taking place between a plurality of components. Those methods of densification by a liquid technique or a gas technique are well known in themselves, and they can be associated with each other.

Whatever the fabrication method used, thermostructural composite materials present residual pores constituted by pores of greater or smaller size (macropores and micropores) that communicate with one another.

Proposals have been made to finish off the densification of thermostructural composite materials by siliciding, i.e. by introducing molten silicon. The object is to modify the thermomechanical characteristics of the materials, e.g. by increasing thermal conductivity or by making the materials more leakproof and/or reducing the cost of final densification, since the conventional method employing the liquid technique or the gas technique then does not need to be continued for the time required to obtain the maximum density that is possible by the method.

Depending on the nature of the composite material, siliciding may be rectional or non-rectional. An example of rectional siliciding, as described in particular in U.S. Pat. No. 4,275,095, consists in taking a composite material having a matrix comprising carbon at least in an outer phase of the material, and in impregnating it with molten silicon that then reacts with the carbon in order to form silicon carbide. An example of non-rectional siliciding is using molten silicon to impregnate a composite material in which the matrix is made of silicon carbide, at least in an outer phase of the matrix, i.e. a composite material in which the outer geometrical surface and the surfaces of the pores communicating with the outside are made of silicon carbide.

Molten silicon is very fluid and possesses high wetting ability, particularly on surfaces of carbon or silicon carbide. When a thermostructural composite material is impregnated with silicon in the liquid state, the silicon advances into the array of pores in the material following the surfaces of the pores. As shown very diagrammatically in FIG. 1, micropores and narrow passages or constrictions in the material M are filled in, however macropores are not filled in since the silicon (Si) flows along their surfaces. The extent to which the pores are filled in is thus random, which means that it is not possible to control thermal diffusivity and leakproofing. In addition, occluded gas pockets are formed that constitute inaccessible closed pores such as P.

Methods have been proposed for filling the pores of the composite material in part before performing infiltration with molten silicon.

Thus, document EP 0 835 853 proposes impregnating the material with an organic resin and performing heat treatment to pyrolize the resin. Nevertheless, the grains of carbon (resin coke) that are obtained are to be found not only in the macropores where they occupy part of their volume, but also in micropores or in constrictions in the array of pores. Under such circumstances, while siliciding, the silicon reacts with the carbon of the grains, thereby increasing their volume and closing off a pore, thereby preventing the silicon from passing. This results in siliciding that is irregular. Furthermore, in particular in the macropores, there remains a carbon phase that is sensitive to oxidation and that is constituted by the resin coke grains that have not been silicided or that have not been silicided sufficiently.

Proposals are also made in document U.S. Pat. No. 5,865,922 to impregnate the thermostructural composite material with a resin having a relatively high coke content together with a pore-generating agent. This agent serves to form a foam prior to polymerization of the resin, so pyrolysis gives a carbon residue that is porous, and that is subsequently impregnated with silicon. That method likewise does not guarantee uniform filling of the initial pores in the composite material by siliciding. While the foam is forming, the resin can flow back out from the material leading to a variable resin content in the material, and irregular porosity in the porous residue that results from pyrolyzing the resin. Furthermore, the transformation into foam can itself be irregular, with relatively large grains of carbon residue being formed that are not silicided in full, and with closed pores being formed in the foam that remain inaccessible to the silicon.

OBJECT AND SUMMARY OF THE INVENTION

An object of the present invention is to propose a method of treating porous thermostructural composite material that makes it possible to implement regular siliciding throughout the pores of the material, and to do so in a manner that is controllable and reproducible.

This object is achieved by a method of the type comprising impregnating composite material with a phase of the molten silicon type, in which method, according to the invention, prior to impregnation with a silicon type phase, an aerogel or xerogel of a precursor for a refractory material is formed within the pores of the composite material, and the precursor is transformed by pyrolysis in order to obtain an aerogel or xerogel of refractory material.

Advantageously, the aerogel or xerogel is formed by impregnating the composite material with a composition containing at least one organic, organometalloid, or organometallic compound in solution, and by gelling in situ.

In a particular implementation of the method, prior to impregnating with a silicon type phase, the steps of impregnation with a composition containing at least one organic, organometalloid, or organometallic compound in solution followed by in situ gelling are repeated a plurality of times.

In an implementation of the method of the invention, an aerogel or a xerogel constituted by an organic material that is a precursor of carbon is formed within the pores of the composite material, which organic material, after pyrolysis, gives a carbon aerogel or xerogel.

The organic aerogel or xerogel can be formed by impregnating the composite material with a composition containing an organic resin precursor in solution.

Organic aerogels and xerogels suitable for providing carbon aerogels or xerogels after pyrolysis are well known. Reference can be made in particular to U.S. Pat. No. 4,997,804 and to an article by L. Kocon in the publication "Revue Scientifique et Technique de la Direction des Applications Militaires" [Scientific and Technical Journal of the Military Applications Directorate], No. 24, March 2001, pp. 30-140 and entitled "Céramiques Poreuses, Aérogels de silice et de carbonne" [Porous ceramics, silica and carbon aerogels], to an article by R. Préticévic et al. in the publication "Carbon", 39 (2001) of "Elseviers Science Ltd", pp. 857-867, entitled "Planar fiber reinforced carbon aerogels for application in PEM fuel cells".

In another implementation of the method of the invention, an aerogel or xerogel constituted by a precursor of a ceramic type refractory material is made in the pores of the composite material, and after pyrolysis that gives a ceramic aerogel or xerogel. In the present specification, a refractory material is said to be of the "ceramic type" when the refractory material is other than carbon, in particular of the carbide, nitride, boride, or oxide type.

The aerogel or xerogel of ceramic precursor material can be formed in particular by impregnating the composite material with a composition containing an organosilicon compound in solution, for example an organosilicon compound that is a precursor of silicon carbide, such as polycarbosilane.

The above-identified article by L. Kocon describes how to make aerogels out of oxide type refractory material.

The composite material is silicided after at least one refractory material aerogel has been formed.

The term "siliciding" is used herein to mean impregnating the thermostructural composite material with a phase of the molten silicon type that penetrates into the pores of the composite material, the "phase of the silicon type" being constituted:

either by silicon and/or germanium (i.e. silicon on its own, germanium on its own, or a mixture of silicon and germanium in any proportions);

or else for the most part by silicon and/or germanium alloyed with at least one metal or another metalloid.

Under such circumstances, the metal or other metalloid may be selected in particular from iron, cobalt, titanium, zirconium, molybdenum, vanadium, carbon, or boron, depending on the particular properties that are to be conferred on the thermostructural composite material after siliciding, or in order to prevent elements constituting the composite material matrix from dissolving in the silicon type phase.

An organic, organometalloid, or organometallic aerogel or xerogel presents a gossamer structure which, after pyrolysis, gives a very porous three-dimensional array of refractory material made of particles that are very fine. These particles are filamentary arrangements of nanoparticles, i.e. of diameter of the order of about 10 nanometers (nm); that is a particular nanometric structure that gives the aerogel or xerogel a nanomaterial characteristic and that is quite different from the structure of a foam as envisaged in U.S. Pat. No. 5,865,922.

The array formed by the aerogel or xerogel subdivides the initial pores of the composite material so that pores are obtained that are regular, in communication with one another, and without any particles being formed that might lead to pores being obstructed, thereby impeding progress of the silicon type phase. This leads to siliciding that is regular.

In addition, and this is a remarkable result that the invention provides, when the aerogel or xerogel is made of carbon, the fineness of the carbon particles, of nanometer size, means that they are silicided in full, such that after siliciding, there does not remain any oxidizable carbon phase derived from the carbon aerogel or xerogel, and a nanoarray of carbide particles is obtained that is dispersed in the silicon type phase.

A method in accordance with the invention can also be used for binding together parts made of thermostructural composite material. After the respective surfaces of the parts that are to be joined together have been brought side by side, a method of the kind defined above can be implemented, comprising forming a aerogel or xerogel of refractory material within the pores of the composite materials of the parts and within the interface or joint between said surfaces of the parts, followed by siliciding by impregnation with a silicon type phase.

The use of an aerogel or xerogel of refractory material, characteristic of the method in accordance with the invention, thus turns out to be particularly advantageous for achieving regular densification by siliciding, making it possible to obtain characteristics that are uniform and reproducible, in particular in terms of thermal conductivity, leakproofing, tribological properties, . . . .

Specifically when making thermostructural composite materials leakproof, siliciding can be followed by a step of forming a surface coating of ceramic material, e.g. by chemical vapor infiltration or deposition.

With a carbon aerogel or xerogel, siliciding involves reacting with the aerogel or xerogel, thereby transforming it into a nano-particulate refractory material of ceramic type.

In contrast, with an aerogel or xerogel made of a ceramic type refractory material, siliciding need not lead to reaction with the aerogel or xerogel.

In both cases, and according to another aspect of the invention, a silicided thermostructural material part is obtained in which the thermostructural composite material comprises a silicon type phase containing at least one aerogel or xerogel, i.e. a nanometric array of ceramic type refractory material.

In a particular application, the silicided thermostructural composite material part is a friction part comprising a carbon/carbon composite material with pores that are filled in at least in part by a silicon phase that contains a nanometric silicon carbide array. Such friction parts made of silicided C/C composite material and in the form of disks can then be used for providing a set of stator and rotor disks for a multidisk airplane brake.

In a variant, in a set of stator and rotor disks for an airplane brake, it is possible to associate C/C composite material rotor disks that have been silicided in accordance with the invention with C/C composite material stator disks that are not silicided, or vice versa.

In another particular application, silicided thermostructural composite material parts obtained by a method in accordance with the invention constitute electrodes, in particular anodes and/or cathodes and/or accelerator grids, for ion or plasma engines, or indeed bipolar plates for fuel cells.

BRIEF DESCRIPTION OF THE DRAWINGS

The invention will be better understood on reading the following description given by way of non-limiting indication and with reference to the accompanying drawings, in which.

DETAILED DESCRIPTION OF EMBODIMENTS

This application is a divisional of U.S. patent application Ser. No. 10/545,734 filed Aug. 16, 2005 which is a §371 national phase filing of PCT/FR2004/000345 filed Feb. 16, 2004, and claims priority to a French application No. 0301871 filed Feb. 17, 2003 all of which are incorporated by reference herein.

Figure 1:
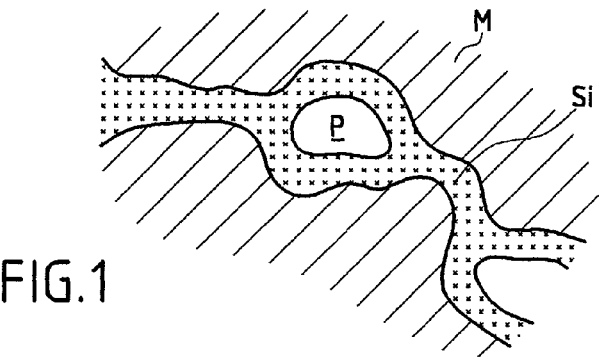
FIG. 1, described above, shows very diagrammatically the result obtained by performing siliciding on a thermostructural composite material without subdividing its pores.
Figure 2:
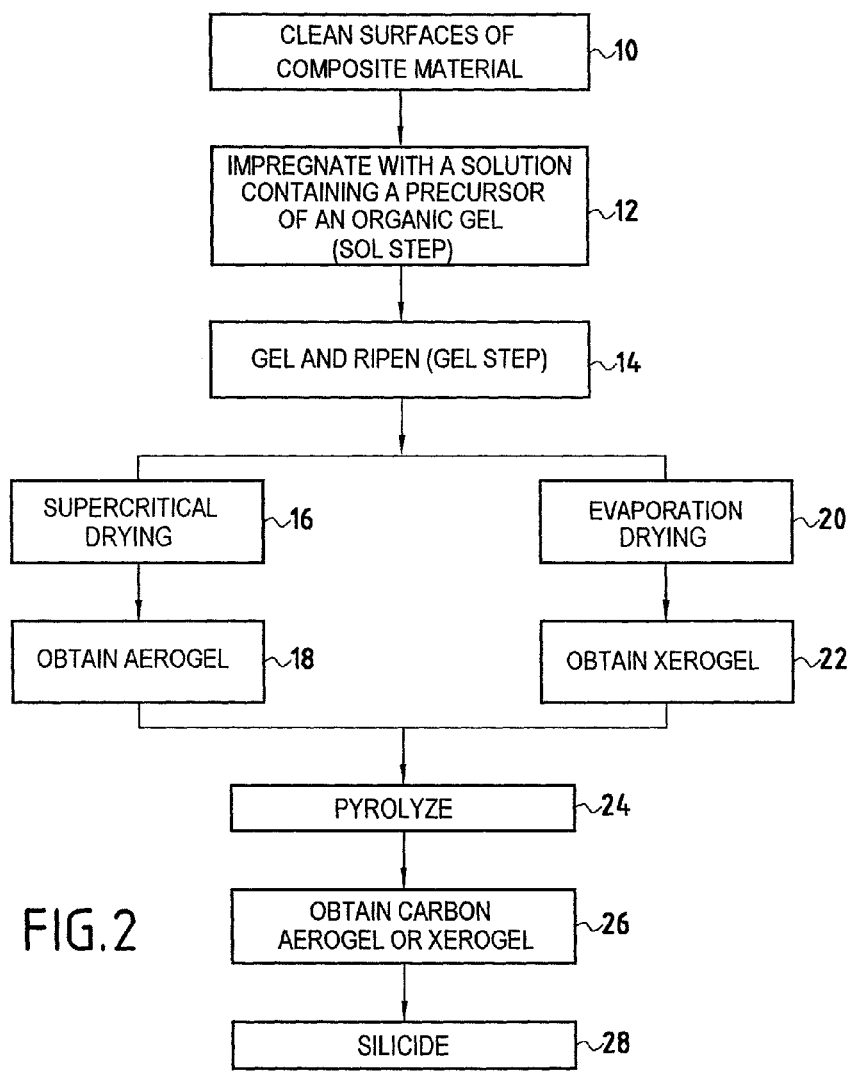
FIG. 2 is a flow chart showing the successive steps in an implementation of a method of the invention.

FIG. 2 shows the successive steps in an implementation of a method in accordance with the invention. The method is implemented on a piece of thermostructural composite material, in particular a C/C composite or a CMC, having fiber reinforcement and a matrix densifying the fiber reinforcement. The thermostructural composite material presents pores made up of pores of greater or smaller size that communicate with one another. Overall porosity is greater or smaller depending on the degree to which the composite material has been densified.

The purpose of the method is to silicide the thermostructural composite material part so as to confer particular properties on the material, such as thermal conductivity, leakproofing, or tribological characteristics. The method also seeks to implement a final step of densifying the material under conditions that are less expensive than those that would otherwise need to be implemented in order to finish off densification by a conventional liquid technique or by chemical vapor infiltration.

An optional first step 10 in the method of FIG. 2 consists in performing treatment to clean the accessible surfaces of the composite material, particularly when the material comprises a silicon carbide (SiC) matrix phase having a surface on which a film of oxide, in particular of silica ($SiO_2$), might have formed. It is desirable to eliminate the silica film in order to encourage wetting of the surfaces of the pores during subsequent siliciding. To this end, it is possible to implement heat treatment causing SiO and CO gas to be formed by reaction between $SiO_2$ and SiC. The heat treatment temperature can be lowered by performing the treatment under low pressure. It is also possible to attack the oxide film of $SiO_2$ (or of SiOC) by means of a hot reagent gas such as carbon dioxide $CO_2$ or sulfur hexafluoride $SF_6$. The accessible surfaces of the composite material can also be cleaned by acid attack, e.g. using hydrofluoric acid HF and/or nitric acid $HNO_3$.

Thereafter, the thermostructural composite material is impregnated with a solution made up of components that serve, after gelling, ripening, and drying, to obtain an organic aerogel or xerogel (sol step 12).

By way of example, for the sol step, it is possible to use an aqueous solution containing resorcinol and formaldehyde together with an optional catalyst such as sodium carbonate. Various examples of solutions are given in U.S. Pat. No. 4,997,804. Other precursors of organic gels in the hydroxybenzene family can be used such as phloroglucinol in solution in water and associated with a reactant such as formaldehyde.

Gelling (polymerization) (gel step 14) is performed in situ by moderate heating, where the temperature must remain below the evaporation temperature of the solvent. With an aqueous solution, this temperature generally lies in the range 50° C. to 100° C. In the above example, gelling consists in performing a reaction between the resorcinol and the formaldehyde. Gelling is followed by a ripening step of duration that may cover one to several days, the material being left at the gelling temperature.

This produces a three-dimensional (3D) gossamer array of a three-dimensional organic gel holding the solvent captive by capillarity.

It should be observed that solvents other than water could be used insofar as they constitute solvents for the components of the impregnation composition, but are not solvents of the polymer obtained after gelling.

Thereafter, the solvent is eliminated by drying under conditions that ensure that the 3D array does not collapse in spite of the capillary forces acting on the filamentary components of the gel.

Drying may be performed by putting the gel into conditions that are supercritical for the solvent (step 16) by increasing pressure and then temperature so as to be situated beyond the critical point, and then eliminating the solvent in the hyperfluid state by isothermal decomposition, thereby achieving elimination without boiling. After cooling, a dry gel, or aerogel, is obtained in the form of a highly porous 3D structure (step 18). Where appropriate, it is possible to begin with a solvent exchange operation for replacing the solvent of the impregnation composition with some other solvent that lends itself well to supercritical drying.

In a variant, drying can be performed in controlled manner by slow evaporation (step 20). For example, after gelling and ripening in a confined atmosphere, the composite material may simply be left in air to allow the solvent to evaporate. A dry gel or "xerogel" is then obtained in the form of a porous 3D structure (step 22).

It should be observed that supercritical drying makes it possible to confer on aerogels a structure that has few fissures in comparison with xerogels that may present fissures. Fissures are often caused by the gel shrinking within the pores, since the bonding between the gel and the pore wall is stronger than the breaking strength within the gel. Such fissures can be advantageous while siliciding since they provide access paths into the volume of the xerogel for the molten silicon type phase.

The resulting aerogel or xerogel is pyrolyzed (step 24). This is performed by raising its temperature to above about 600° C., e.g. to a temperature in the range 600° C. to 2000° C., or even higher, under an atmosphere of an inert gas such as nitrogen or argon, or under a vacuum. This produces an aerogel or xerogel made of carbon (step 26).

The following step 28 consists in siliciding. As mentioned above, the term "siliciding" is used herein to mean impregnating the pores of the thermostructural composite material with molten silicon and/or germanium alone or alloyed with at least one other element of the metal or metalloid type, with the silicon and/or germanium nevertheless remaining in the majority.

For siliciding purposes, the composite material part is taken to a temperature lying in the range about 1400° C. to 1500° C., for example. Advantage can be taken of this rise in temperature to pyrolyze the organic aerogel or xerogel (step 26 above).

The composite material can be impregnated with the silicon type phase in various known manners. Several are described below for a silicon type phase that is constituted by silicon.

Figure 3:
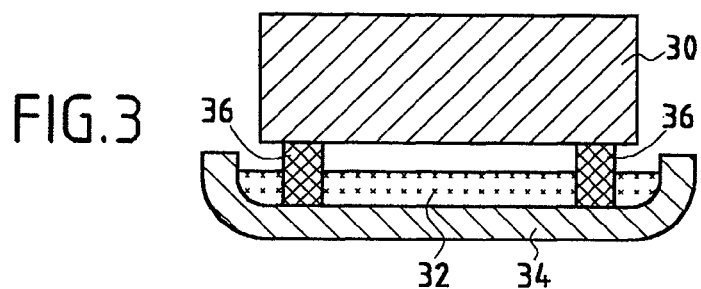
FIGS. 3 to 8 are diagrams showing different ways of impregnating a thermostructural composite part with a molten silicon type phase.

A first manner (FIG. 3) consists in placing the thermostructural composite material part 30 that is to be impregnated and that has been provided with the carbon aerogel or xerogel on the surface of molten silicon 32 contained in a crucible 34. The part is supported by studs 36, e.g. of porous graphite, standing on the bottom of the crucible and feeding the part with molten silicon by capillarity.

A second manner (FIG. 4) consists in placing the part 40 close to a crucible 44 containing molten silicon 42, and in using a drain 46 as transport means, the drain having one end immersed in the crucible and the other end placed in contact with the part. The drain serves to transport silicon in the liquid state by capillarity from the crucible to the part.

The drain may originally be formed by a mesh of continuous carbon filaments or by a braided core, or by a braid of discontinuous carbon filaments. Advantageously, it is also possible to use a wick, cord, or braid made of SiC filaments or of carbon filaments pre-impregnated with pure or alloyed silicon.

The end in contact with the part may be secured thereto by a spot of adhesive, by binding, or by pinching. The carbon filaments are silicided and converted into silicon carbide by coming into contact with the molten silicon.

Figure 5:
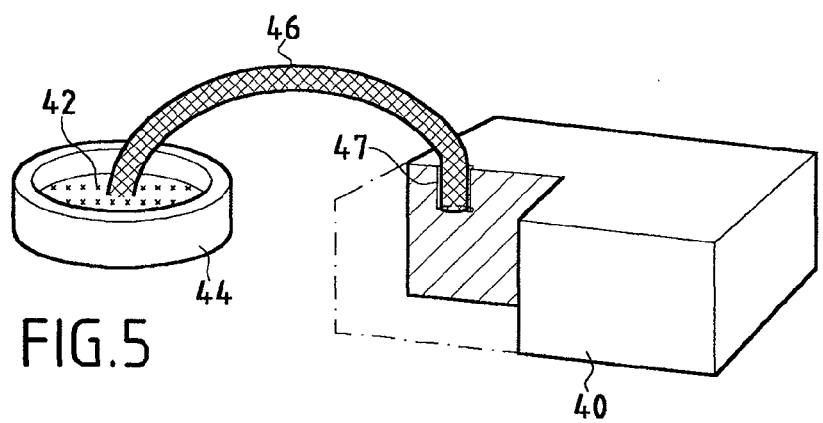

In a variant, and as shown diagrammatically in FIG. 5, the end of the drain 46 that is in contact with the part can be received in a blind hole 47 formed in the part 40 so as to facilitate feeding the entire volume of the part with the silicon type phase.

Figure 4:
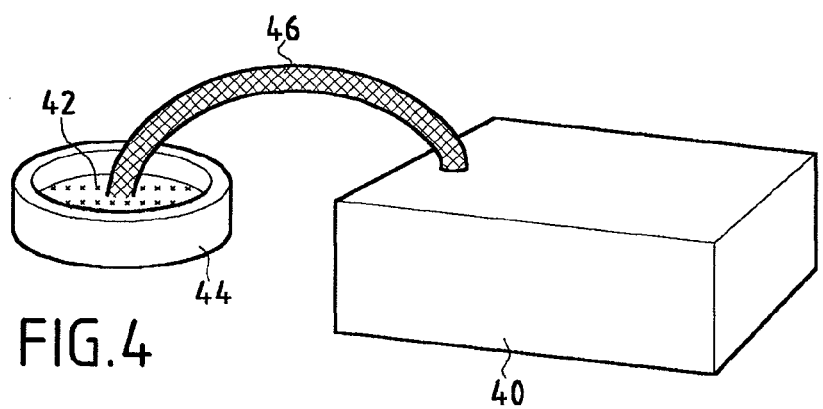

As shown in FIGS. 4 and 5, the part can be fed in the vicinity of one end thereof, with the molten silicon progressing through the pores in the composite material part containing a carbon aerogel or xerogel. The pores, being subdivided by the aerogel or the xerogel, become filled in progressively. When the accessible volume has been filled, excess silicon remains in the crucible. Nevertheless, the quantity of silicon present in the composite material can be adjusted by adjusting the quantity of molten silicon that is delivered during siliciding.

Siliciding is rectional with respect to the aerogel or xerogel if it is made of carbon, in which case it is transformed into an aerogel or xerogel of silicon carbide by reacting with the molten silicon. Siliciding may also be reactive with the thermostructural composite material depending on the nature of the matrix material forming the surfaces of the pores through which the molten silicon travels.

After siliciding, a thermostructural composite material part is obtained with a silicon matrix phase containing an aerogel or xerogel made of silicon carbide.

It may be useful to control the flow of silicon at the surface of the composite material of the part 40, and more particularly to prevent it flowing so as to encourage the silicon to penetrate into the composite material on coming into contact with the part.

Figure 6:
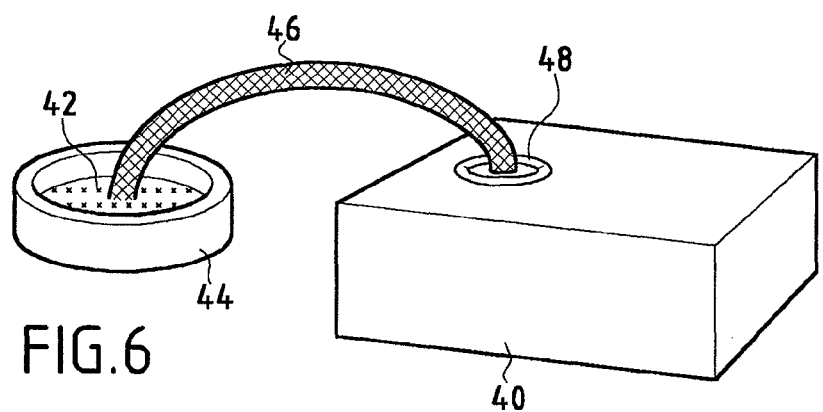

For this purpose, it is possible to deposit material around the contact area between the drain and the part for the purpose of opposing any flow of silicon on the surface, i.e. a material that is not wetted by silicon and that does not react therewith. A material that is suitable for this purpose is a material based on hexagonal boron nitride BN. As shown in FIG. 6, it can be implemented in the form of a bead 48 surrounding the contact area between the drain 46 and the part 40, thereby preventing the silicon from spreading over the surface of the part 40. The bead 48 may be formed of BN paste of the kind sold under the reference "Combat Boron Nitride" by US supplier Carborundum.

Instead of the bead 48, or in combination therewith, it is possible to spray a BN film onto the surface of the part 40 other than in the area of contact between the drain 46 and the part. The product sold under the name "DN60" by Acheson, a department of the British National Starch and Chemical Company can be used for this purpose.

BN or some other material having the same function need not be deposited all the way round the area of contact between the drain and the composite material surface of the part 40, depending on the extent to which it is desired to limit the flow of silicon on said surface.

In a variant, in particular when the thermostructural composite material part for siliciding is of relatively large size, it can be fed with molten silicon via a plurality of points.

Figure 7:
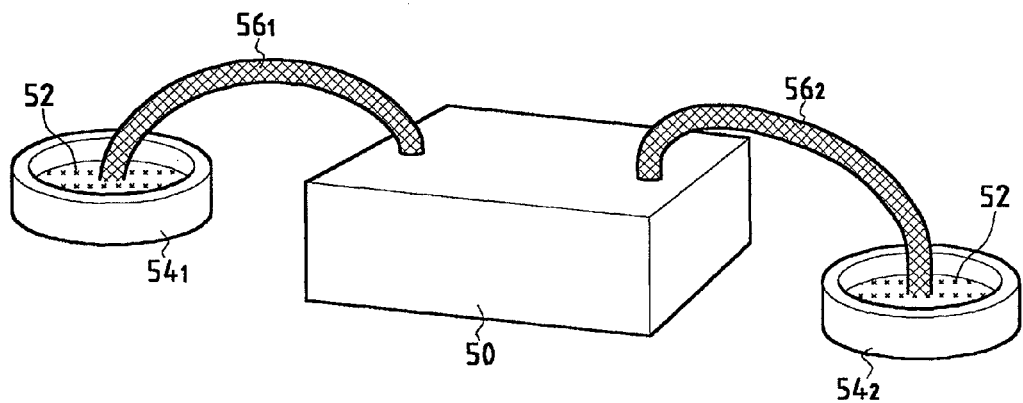

Thus, FIG. 7 shows a part 50 which is fed from two crucibles $54_1$ and $54_2$ containing molten silicon 52. The crucibles are connected to the part via respective drains $56_1$ and $56_2$ which come into contact with the part in the vicinity of opposite ends thereof.

Figure 8:
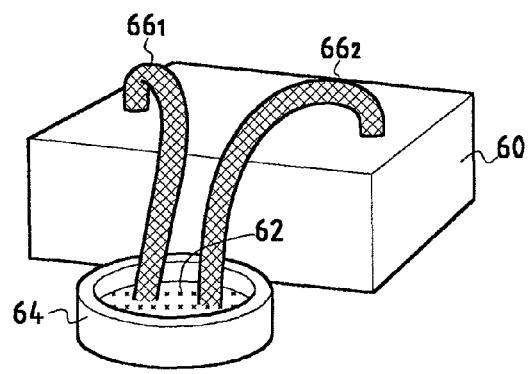

FIG. 8 shows a part 60 that is fed from a single crucible 64 containing molten silicon 62, by means of two drains $66_1$ and $66_2$ connecting the crucible to two opposite end portions of the part.

As mentioned above, the impregnation method shown in FIGS. 3 to 8 can be used with a silicon type phase other than one constituted by silicon alone, i.e. a phase containing germanium and/or at least one other element of metalloid type or of metal type selected, for example, from: boron, carbon, iron, cobalt, titanium, zirconium, molybdenum, and vanadium. In any event, siliciding is preferably performed at a temperature that is only slightly higher than the melting temperature of the silicon type phase, e.g. within 15° C. or even 10° C. above said melting temperature. Under such conditions, the viscosity of the silicon type phase remains relatively high, thereby enabling the aerogel and the pores in the composite material to be invaded slowly, thereby ensuring that filling is more complete.

Associating germanium with the silicon can serve to lower the melting point in order to avoid possible degradation of the fiber reinforcement of the composite material when said reinforcement is made of fibers that remain stable only up to a temperature close to or below the melting point of silicon (about 1410° C.). This applies in particular to SiC fibers as sold under the name "NLM 202" by the Japanese supplier Nippon Carbon for which stability can be affected at temperatures below 1250° C. The presence of germanium also makes it possible, by oxidation, to form germanium oxide $GeO_2$ which, like $SiO_2$, forms a glass that provides protection against oxidation. Compared with $SiO_2$, an advantage of the oxide $GeO_2$ is that it forms at lower temperature and has a lower softening temperature. This makes it possible to extend the range over which there is provided an ability to self-heal the cracks that might appear in the surface of the material, with self-healing being produced by softening of the vitreous compounds formed by oxidation. Healing the cracks protects the material from the surrounding oxidizing medium and contributes to providing effective protection against oxidation.

Adding boron makes it possible firstly to lower the melting temperature of the silicon type phase, and secondly to form a borosilicate type glass ($SiO_2$, $B_2O_3$) by oxidation that presents good self-healing properties and thus provides protection against oxidation. When the matrix of composite material contains boron, e.g. when it is a matrix containing at least one phase of the Si—B—C type as described in U.S. Pat. Nos. 5,246,736 and 5,965,266, the use of a silicon type phase that is saturated with boron also makes it possible to avoid the boron of the matrix diffusing in the silicon type phase during the siliciding heat treatment which would lead to degradation of the composite material matrix.

Associating at least one metalloid other than Si or Ge and/or a metal can make it possible to ensure that no free silicon (or germanium) remains after siliciding, thereby imparting an improved refractory nature to the material. For example, it is possible to use a silicon type phase containing an alloy of silicon and molybdenum in which the quantity of silicon is selected so that after siliciding, all of the silicon has reacted to form SiC by reacting with the carbon of the aerogel or xerogel and by forming $MoSi_2$, which is a highly refractory compound, by reacting with the molybdenum. The same applies when all or some of the molybdenum is replaced by some other metal from those mentioned above.

Associating carbon and titanium with the silicon can produce a compound $Ti_3SiC_2$ which is a strong refractory ceramic of lamellar structure. By dissipating energy between layers, such a lamellar structure makes it possible to stop cracks propagating within the composite material, thereby improving its strength against impacts.

Figure 9:
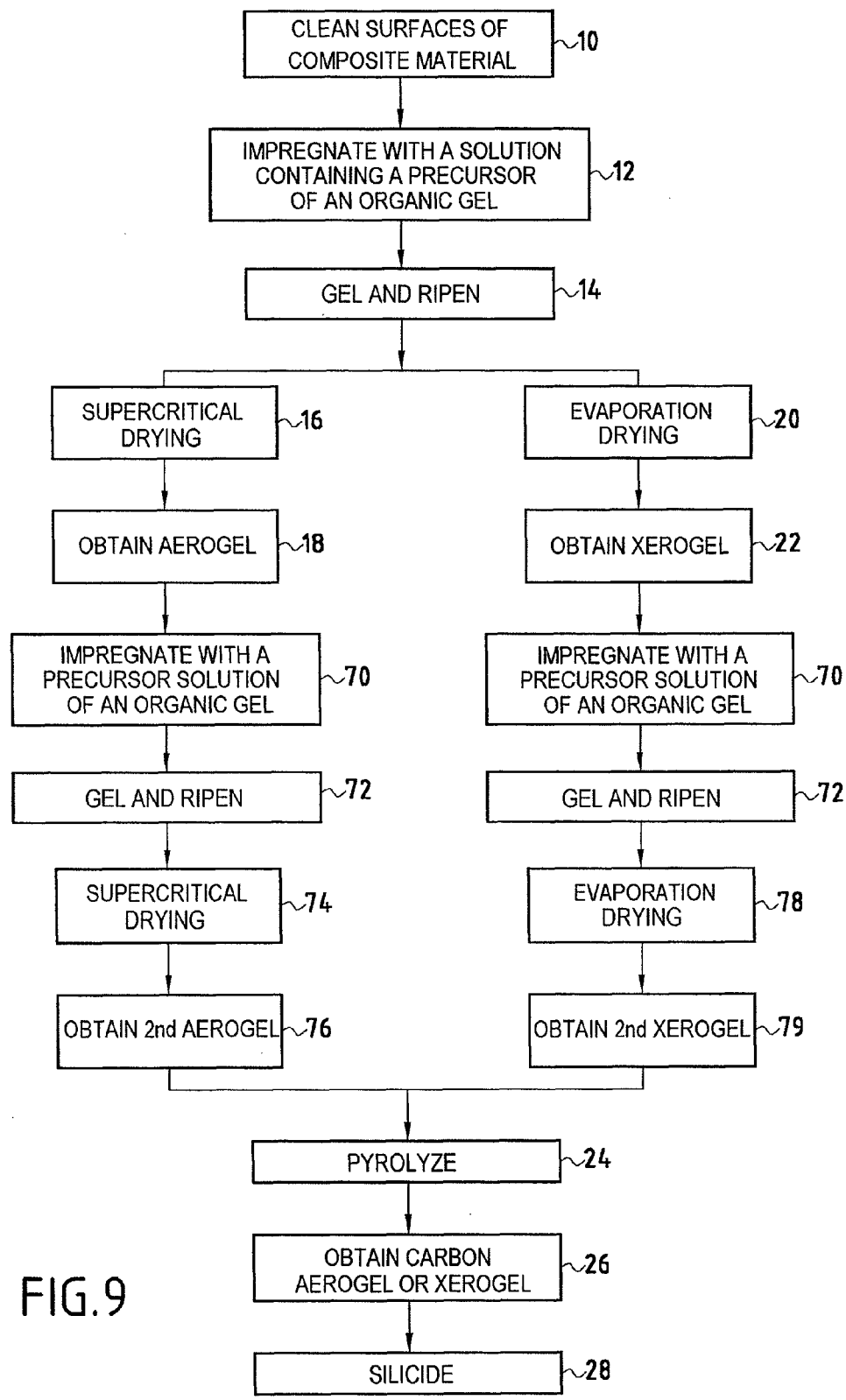
FIGS. 9 and 10 are flow charts relating to variants of the implementation of the method shown in FIG. 2.

The carbon content of the final aerogel or xerogel can be controlled in two manners. A first manner consists in controlling the reaction between the components in the aqueous solution used for impregnating the thermostructural composite material, e.g. the ratio between the resorcinol, the formaldehyde, and the sodium carbonate. The second manner consists in repeating the introduction of an aerogel or xerogel. Thus, FIG. 9 shows another implementation of the method which differs from that of FIG. 2 in that after step 18 of obtaining an aerogel or step 22 of obtaining a xerogel, there are performed steps 70, 72, 74 or 70, 72, 78 of impregnating with a solution containing a precursor of an organic cell (step 70), of gelling and ripening (step 72), and of drying supercritically (step 74) or by evaporation (step 78). This produces a second aerogel structure (step 76) or xerogel structure (step 79) interpenetrating with the first.

The pyrolysis step 24 serves to obtain a carbon aerogel or xerogel (step 26) that is more dense than that which is obtained by the method of FIG. 2, while still remaining nanometric and gossamer-like. Siliciding is then performed (step 28).

Forming an aerogel or xerogel prior to siliciding can be repeated more than twice.

In a variant, it is possible to form in succession an aerogel and then a xerogel (or vice versa). The probability of the xerogel fissuring, providing access paths to the silicon type phase during siliciding, can then be of interest insofar as the prior filling of the pores in the composite material is more dense.

It should be observed that increasing in the quantity of carbon by forming a plurality of aerogels and/or xerogels in succession enables a larger fraction of the silicon (and/or germanium) introduced for the reaction with the carbon to be consumed, and thus serves to reduce the quantity of free silicon (and/or germanium) that remains in the end in the material.

Figure 10:
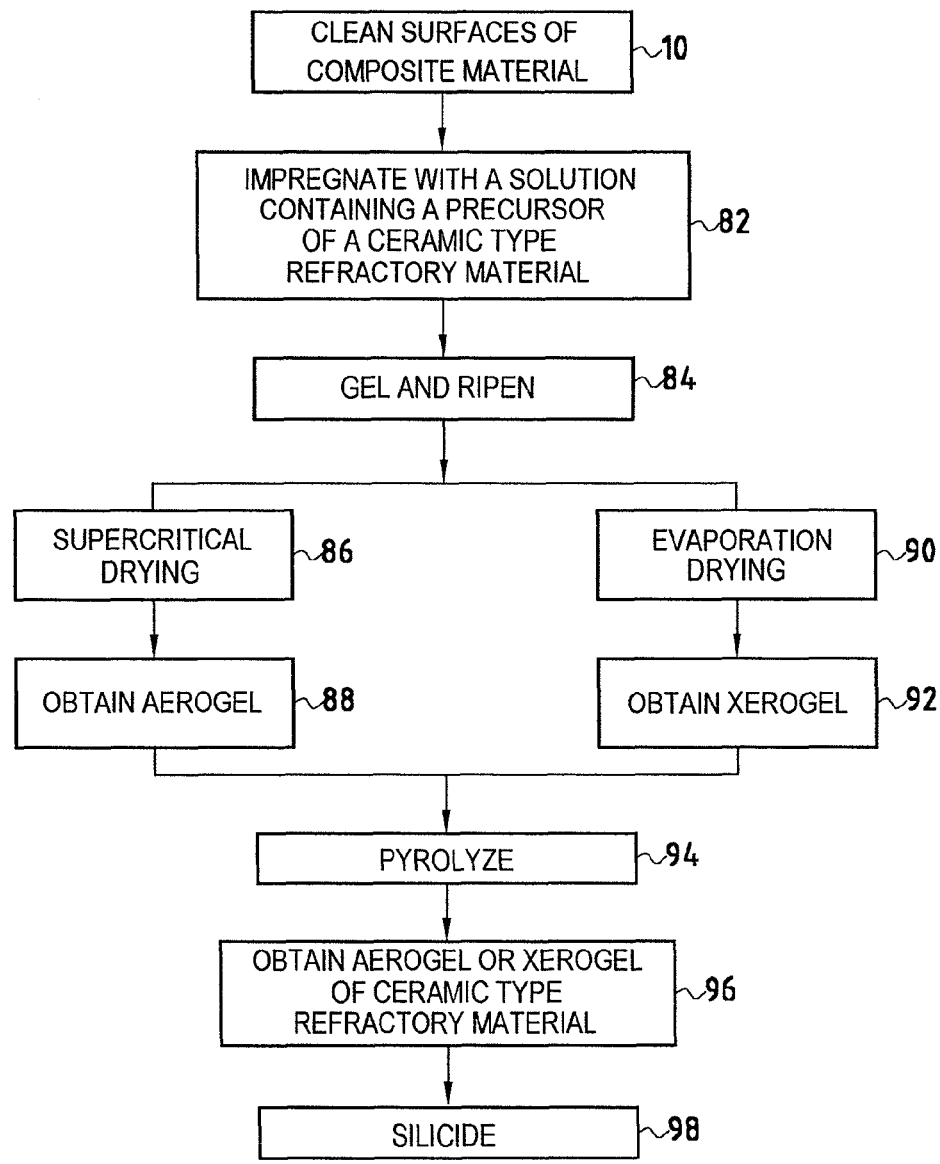

In yet another implementation of the method of the invention (FIG. 10) prior to siliciding, at least one aerogel or xerogel of ceramic type refractory material is put into place within the pores of the thermostructural composite material.

This implementation differs from that of FIG. 2 in that after the optional step 10 of cleaning the accessible surfaces of the thermostructural composite material, impregnation is performed with a composition containing a solution of a compound that is a precursor of a ceramic type refractory material (step 82).

The term ceramic type refractory material is used herein to mean in particular a material of the carbide, nitride, boride, or oxide type.

The precursor may be an organometalloid compound or an organometallic compound. Thus, with a ceramic material made of silicon, the precursor may be an organosilicon compound. For example, the organosilicon compound can be polycarbosilane (PCS) which is a precursor of SiC. The solvent is selected as a function of the compound used. For PCS, it is possible to select a solvent from xylene, toluene, heptane, and hexane, for example. In order to gel (polymerize) the PCS, a catalyst may be added to the impregnation solution, e.g. borodiphenylsiloxane. Another usable precursor of SiC is polyvinylsilane (PVS) which can give a gel by reacting with a peroxide.

After impregnation with the composition containing a solution of ceramic type refractory material precursor, in situ gelling is performed within the pores of the composite material, which gelling is followed by ripening (step 84).

Gelling is performed in a stove, in a closed enclosure at a temperature below the evaporation temperature of the solvent.

After gelling and ripening, there follows a step of supercritical drying, possibly after solvent exchange (step 86) in order to obtain an aerogel of the precursor of the ceramic type material (step 88), or a step is performed of drying by evaporation (step 90) in order to obtain a xerogel of the precursor of the ceramic type material (step 92).

The steps of supercritical drying or drying by evaporation are similar to the steps 18 and 22 of the method of FIG. 2.

Pyrolysis (step 94) is then performed to obtain an aerogel or xerogel of ceramic type refractory material (step 96). Pyrolysis is performed at a temperature in the range 600° C. to 2000° C. (or even more) depending on the nature of the precursor.

A plurality of aerogels and/or xerogels of the ceramic type material precursor can be formed in succession prior to pyrolysis.

It is also possible to form in succession an aerogel or xerogel of carbon precursor and then an aerogel or xerogel of ceramic type material precursor, or vice versa.

After pyrolysis, a siliciding step is performed (step 98) by impregnating the composite material with a molten silicon type phase. Siliciding can be performed as described above.

This produces a thermostructural composite material part in which the matrix includes a silicon type phase holding captive at least one aerogel or xerogel of ceramic type refractory material.

Depending on the nature of the aerogel or xerogel, siliciding may be non-rectional, leaving the aerogel or xerogel unchanged.

The method of treating thermostructural composite material parts in accordance with the invention enables parts obtained by the method to have conferred on them particular properties that are stable and reproducible in terms of thermal conductivity, mechanical strength, leakproofing, and tribological characteristics.

Thus, in a particular application of the method, it can be used to obtain electrodes of silicided thermostructural composite material, in particular of silicided C/C composite material.

Compared with electrodes of C/C composite material as obtained without treatment by the method in accordance with the invention, it is thus possible to improve mechanical strength and to make the electrodes more leakproof, without affecting electrical conductivity.

Electrodes obtained by a method of the invention are suitable for use in particular as anodes and/or cathodes and/or accelerator grids for plasma engines or ion engines.

Another, similar application is making bipolar plates for fuel cells.

In another particular application, described below in the examples, a method of the invention can be used to obtain friction parts for brakes or clutches having improved tribological properties.

A method in accordance with the present invention can also be used for bonding together thermostructural composite material parts. Such a bond can be desired in particular for the purpose of obtaining an element of complex shape or of dimensions that are relatively large and difficult or impossible as a single part.

Figure 11:
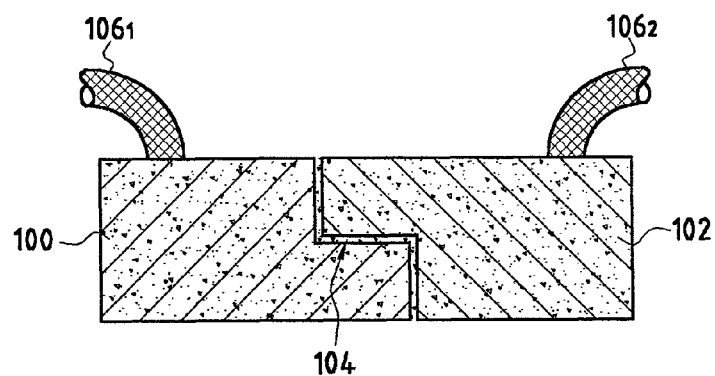
FIG. 11 is a highly diagrammatic view of an application of a method in accordance with the invention for using siliciding to bond together parts made of thermostructural composite material.

Two parts 100, 102 of thermostructural composite material for assembling together (FIG. 11) are united with respective surfaces placed side by side. In the figure, for simplification purposes, the parts shown are simple in shape.

The parts 100 and 102 are impregnated in a solution having components that serve, after gelling, ripening, and drying, to obtain an aerogel or xerogel made of a carbon precursor or a ceramic material precursor. The aerogel or the xerogel is formed within the accessible pores of the composite material of the parts 100 and 102, and also in the interface or joint 104 defined by the adjacent surfaces of the parts.

After the precursor has been transformed by pyrolysis, siliciding is performed with a silicon type phase.

This produces a silicon type phase containing a nanometric array of refractory material that extends continuously through the pores of the assembled-together parts and within the joint between them, thus bonding the parts together.

The stages of forming an aerogel or xerogel made of a carbon precursor or a ceramic precursor (where such stages can be repeated), of pyrolysis, and of siliciding, are all performed as described above. During siliciding, the parts 100 and 102 are fed by respective drains 106$_1$ and 106$_2$ connecting the parts to different crucibles containing the silicon type phase, or to a common crucible.

Example 1

The method was implemented on a block of SiC/SiC composite material having fiber reinforcement made essentially of SiC and an SiC matrix obtained by chemical vapor infiltration. The fibers were fibers sold under the name "Hi-Nicalon" by the Japanese supplier Nippon Carbon Co., Ltd. The SiC matrix was obtained in well-known manner from a reaction gas comprising methyltrichlorosilane (MTS) and hydrogen gas ($H_2$).

The block of SiC/SiC material was impregnated with an aqueous solution containing a mixture of phloroglucinol and formaldehyde together with sodium carbonate acting as a catalyst.

Impregnation was performed by immersing the block of SiC/SiC material in a bath of the solution within a vessel in an evaporated closed enclosure, and subsequently returning to atmospheric pressure.

Gelling and then ripening was performed by raising the temperature of the block of impregnated SiC/SiC material to about 55° C. for about 24 hours (h).

The organic aerogel was then obtained by supercritical drying. Solvent exchange was performed to replace the water with carbon dioxide ($CO_2$) by proceeding with an intermediate exchange with ethanol, as described in the above-mentioned article by L. Kocon. Drying was performed by exceeding the critical point of $CO_2$ (31.1° C. and 7.3 megapascals (MPa)).

The resulting organic aerogel was transformed into a carbon aerogel by pyrolysis at 1000° C. under an inert atmosphere, e.g. under nitrogen or argon.

Siliciding was then performed by delivering molten silicon by means of a drain made up of a cord of "Hi-Nicalon" SiC fibers having one end immersed in a crucible containing molten Si, and its other end in contact with the block of SiC/SiC material in which the pores were filled with the carbon aerogel. Siliciding was performed with molten Si at about 1450° C.

Figure 12:
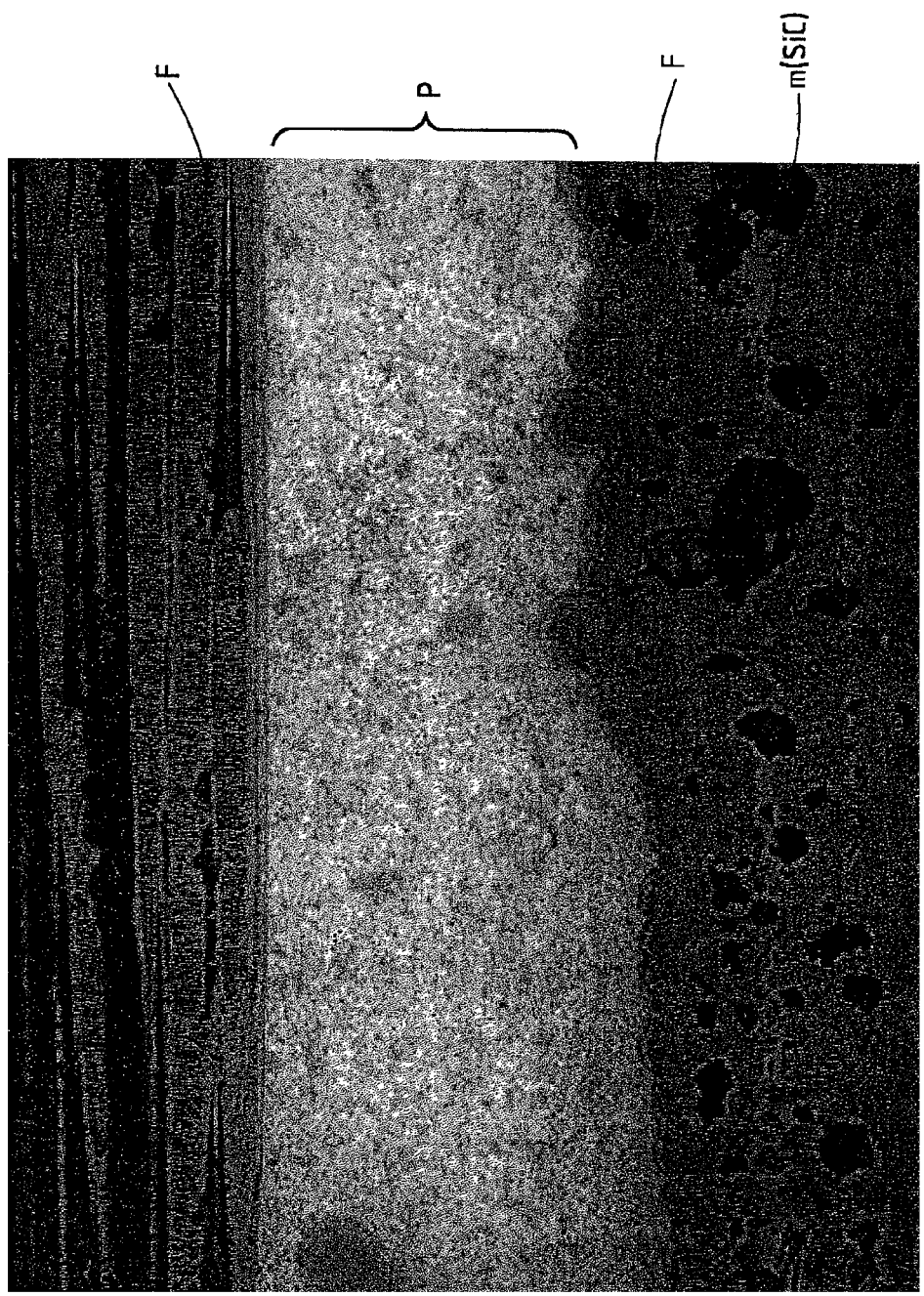
FIGS. 12 and 13 are photographic views taken using an optical microscope, showing a nanometric array of ceramic particles that results from completely siliciding a carbon xerogel and a carbon aerogel using silicon and situated in a silicon type matrix, within the pores of a thermostructural composite material.

Examination of the resulting material under a microscope (FIG. 12) showed that all of the carbon aerogel had been converted into SiC by reacting with the molten silicon, and that free silicon remained within the material. In FIG. 12, silicon carbide appears gray, while free silicon appears white in a pore P of the composite material. There can also be seen the fibers F of the composite material and the SiC matrix which surrounds and interconnects the fibers F.

Figure 14:
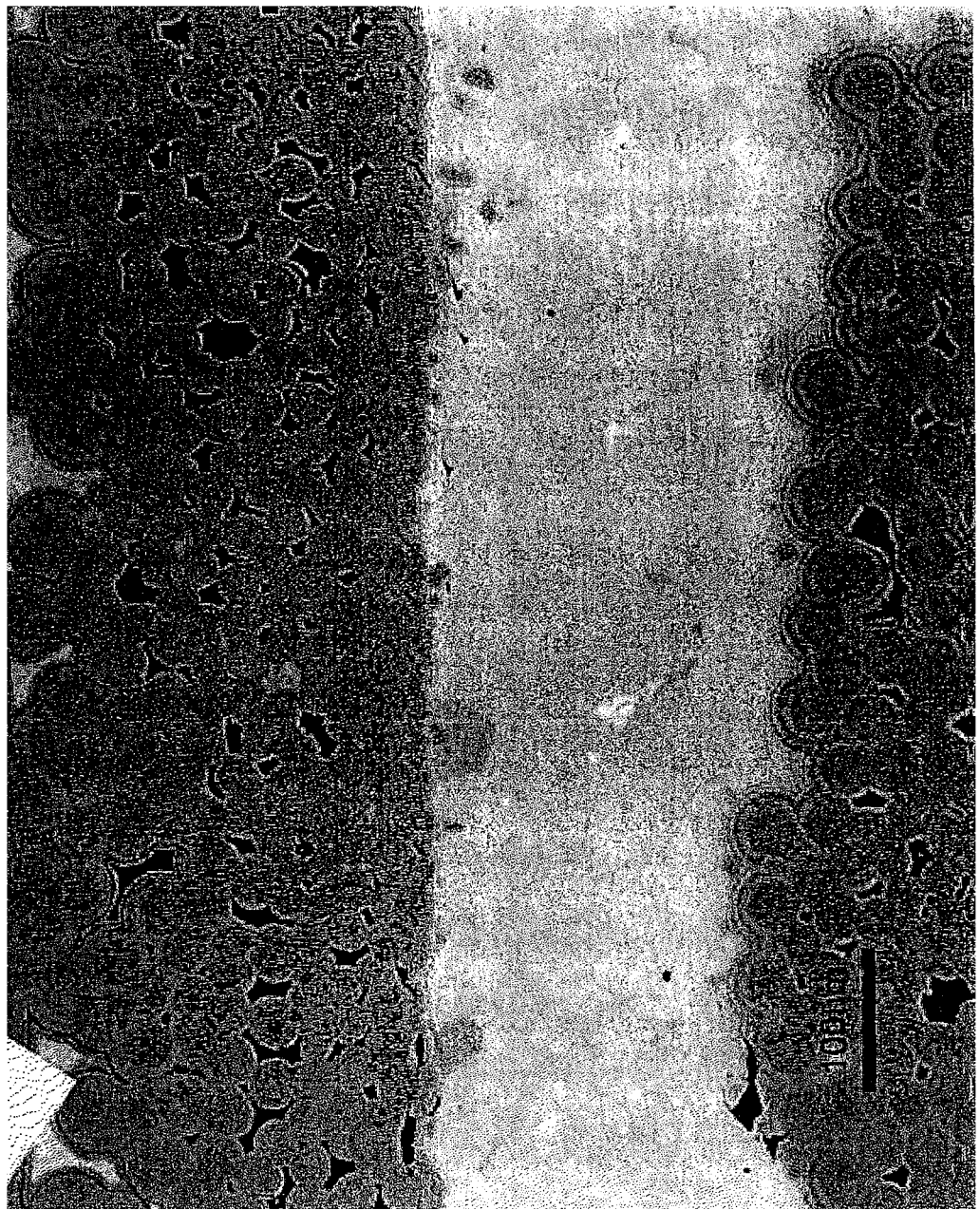
FIG. 14 is a photograph taken with an optical microscope showing a silicon phase in the pores of a thermostructural composite material, but without prior introduction of a xerogel or an aerogel into said pores.

FIG. 14 shows the same SiC/SiC thermostructural composite material after siliciding with molten silicon, but without previously introducing any aerogel into the pore P of the composite material. It can be seen that the pore is merely filled with free silicon.

Furthermore, the thermal conductivity of the silicided SiC/SiC material was measured and found to be multiplied by 4 compared with the same SiC/SiC material in which densification was followed by chemical vapor infiltration.

Example 2

The method was implemented on a block of C/SiC material having carbon fiber reinforcement based on a precursor of preoxidized polyacrylonitrile (PAN) and having an SiC matrix obtained by chemical vapor infiltration from a reaction gas containing a mixture of MTS and of $H_2$.

The block of C/SiC material having porosity of about 15% by volume was impregnated with an aqueous solution containing a mixture of resorcinol and formaldehyde, together with sodium carbonate.

Impregnation was performed by immersion in a bath under a vacuum.

Gelling and ripening were performed by raising the temperature of the block of impregnated C/SiC material to about 55° C. in a stove for a period of about 24 h.

An organic xerogel was then obtained by controlled drying causing the water to evaporate from the gel. For this purpose, the temperature was raised progressively and slowly (2° C./h) up to about 90° C., which was maintained for about 5 h.

The resulting organic xerogel was transformed into a carbon xerogel by pyrolysis by progressively raising the temperature up to about 950° C.

Siliciding was then performed with a silicon type phase comprising 75% Si and 25% Fe (in atomic percentage).

Figure 13:
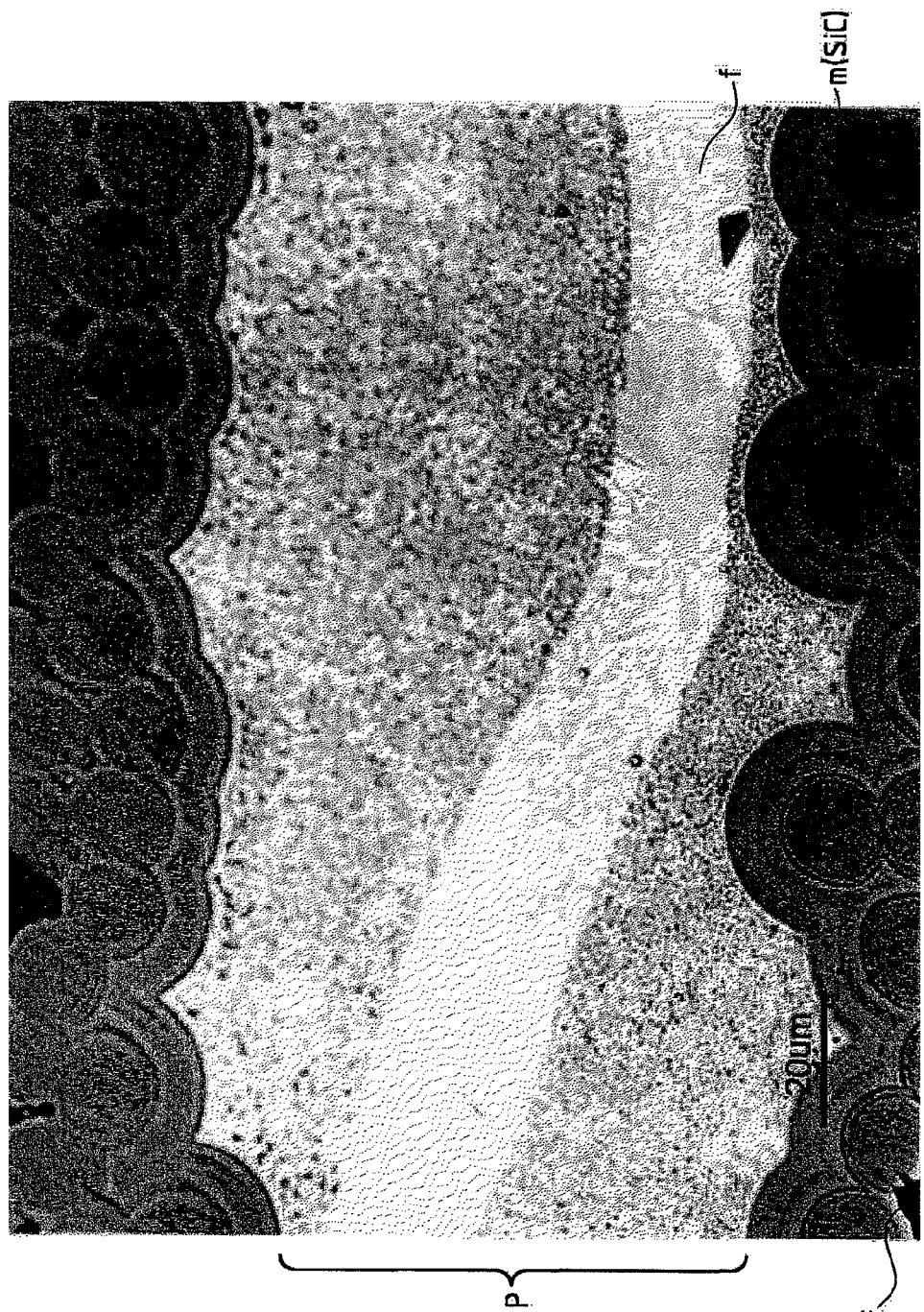

Examination under a microscope (FIG. 13) of the resulting material shows that the carbon xerogel had been converted into SiC. FIG. 13 shows that the xerogel introduced into the pore P in the material is cracked (fissure f), the fissure being filled with free silicon having inclusions of iron silicate. As in FIG. 12, the fibers F and the SiC matrix m of the composite material can be seen.

Example 3

The procedure was the same as in Example 1, except that an SiC/SiC material was used with fiber reinforcement based on "Nicalon NLM 202" fibers of limited temperature stability and siliciding was performed with a mixture of silicon and germanium in 50/50 atomic percentage.

The liquidus temperature of the Si+Ge phase was about 1250° C. After melting the SiC+Ge mixture at 1280° C., the carbon aerogel was reactively impregnated and transformed into carbide without degrading the "Nicalon NLM 202" fibers.

Example 4

A block of SiC/SiC material was used as in Example 1, but impregnation was performed with a composition containing a solution of polycarbosilane (PCS) in xylene in the presence of borodiphenylsiloxane.

Impregnation was performed by immersing the block of SiC/SiC material under a vacuum and then returning to atmospheric pressure.

Gelling was subsequently performed by raising the block of impregnated SiC/SiC material to a temperature of about 80° C. in a sealed enclosure.

A xerogel of SiC precursor was obtained merely by evaporating the solvent in a ventilated stove at 80° C.

An SiC xerogel was subsequently obtained by pyrolysis performed by raising the temperature progressively up to 900° C.

Molten silicon was used to fill in the pores of the SiC xerogel and was introduced by siliciding performed in the same manner as in Example 1.

Example 5

The method was implemented on a block of C/C composite material having carbon fiber reinforcement from a preoxidized PAN precursor and a pyrolytic carbon (PyC) matrix obtained by chemical vapor infiltration. The densification of the PyC matrix was interrupted when the block of C/C material had reached a specific gravity of about 1.4, corresponding to a residual porosity of about 27% by volume.

A carbon xerogel was put into place within the pores of the C/C material block in the manner described in Example 2, and was converted into an SiC xerogel by siliciding, likewise in the manner described in Example 2.

This produced a C/C—(SiC—Si) material characterized in that the macropores in the initial C/C material were filled in not by a silicon phase but by a composite system constituted by a silicon matrix subdivided and reinforced by an SiC xerogel. This subdivision and reinforcement of the silicided phase modified the tribological properties of the initial C/C material, making it possible to obtain a high coefficient of friction and low wear.

Example 6

The procedure was the same as in Example 5, but two xerogels of carbon were put into place in succession within the pores of the block of C/C material prior to siliciding.

The resulting C/C—(SiC—Si) material differed from that of Example 5 by having a greater SiC/Si volume ratio.

By varying the quantity the carbon xerogel, it was thus possible to modify the tribological properties of the resulting material.

The C/C—(SiC—Si) materials obtained from Examples 5 and 6 are suitable for use in particular in friction applications, specifically for making high performance brakes for airplanes, land vehicles, clutches, . . . .

It is thus possible to make friction parts in the form of airplane brake disks with such C/C—(SiC—Si) composite materials.

A set (or heat sink) of rotor disks and of stator disks for an airplane brake can be made up of such disks.

In a variant, in a set of rotor disks and stator disks for an airplane brake, some of the disks, e.g. the rotor disks (or the stator disks) can be made of C/C—(SiC—Si) composite material while the other disks, i.e. the stator disks (or the rotor disks) are made of non-silicided C/C composite material.

Example 7

A test piece of C/SiC composite material was made having dimensions of 50 millimeters (mm)×28 mm×5 mm and was treated as in Example 2.

After siliciding, a helium leak test was performed on the resulting test piece of C/SiC—(SiC—Si) material. The leakage value measured was $10^{-4}$ pascal cubic meters per second (Pa·m$^3$/s) which is a low value. Prior to treatment, such a measurement could not be performed at all, because of the high permeability of the material.

This example shows the capacity of the method of the invention to make thermostructural composite materials leakproof in bulk.

It should be observed that leakproofing can be further improved by forming a coating of ceramic material, e.g. of SiC, on the surface of the silicided composite material. Such a coating can be obtained by chemical vapor deposition or infiltration.

The invention claimed is:

1. A silicided thermostructural composite material part, characterized in that the silicided thermostructural composite material part is formed of a thermostructural composite material having a fiber reinforcement and a matrix densifying the fiber reinforcement, the thermostructural composite material presenting pores filled at least in part with a silicon type phase containing at least one aerogel or xerogel forming a nanometric array of ceramic type refractory material.

2. A part according to claim 1, characterized in that the nanometric array is made of silicon carbide.

3. A part according to claim 1, characterized in that the silicon type phase is constituted by silicon and/or germanium.

4. A friction part according to claim 1, characterized in that the silicided thermostructural composite material part comprises a carbon/carbon composite material having pores filled at least in part with a silicon phase containing a nanometric array of silicon carbide.

5. A set of rotor and stator disks for an airplane brake, characterized in that the disks are friction parts according to claim 4.

6. A set of rotor and stator disks for an airplane brake, characterized in that the rotor disks—or stator disks—are friction parts according to claim 4, while the other disks are made of a non-silicided carbon/carbon composite material.

7. A part according to claim 2, characterized in that the silicon type phase is constituted by silicon and/or germanium.

8. A friction part according to claim 7, characterized in that the silicided thermostructural composite material part comprises a carbon/carbon composite material having the pores filled at least in part with a silicon phase containing a nanometric array of silicon carbide.

9. A set of rotor and stator disks for an airplane brake, characterized in that the disks are friction parts according to claim 8.

10. A set of rotor and stator disks for an airplane brake, characterized in that the rotor disks—or stator disks—are friction parts according to claim 8, while the other disks are made of a non-silicided carbon/carbon composite material.

\* \* \* \* \*